United States Patent [19]

Klotz, Jr.

[11] Patent Number: 4,763,991

[45] Date of Patent: Aug. 16, 1988

[54] ADJUSTABLE SIX DEGREE OF FREEDOM MOUNT FOR OPTICAL COMPONENTS

[75] Inventor: Paul R. Klotz, Jr., Harvard, Mass.

[73] Assignee: Litton Systems, Inc., Lexington, Mass.

[21] Appl. No.: 83,155

[22] Filed: Aug. 10, 1987

[51] Int. Cl.$^4$ .............................................. G02B 7/18
[52] U.S. Cl. .................................... 350/321; 350/633; 350/634
[58] Field of Search ............... 350/321, 608, 611, 631, 350/632, 633, 634, 635, 636, 639

[56] References Cited

U.S. PATENT DOCUMENTS

| | | | |
|---|---|---|---|
| 4,226,507 | 10/1980 | Fuschetto | 350/611 |
| 4,362,363 | 12/1982 | Mulder et al. | 350/608 |
| 4,494,830 | 2/1985 | Grainge et al. | 350/321 |
| 4,540,251 | 9/1985 | Yau et al. | 350/611 |
| 4,640,591 | 2/1987 | Cutburth | 350/634 |
| 4,657,361 | 4/1987 | Eitel et al. | 350/632 |
| 4,681,408 | 7/1987 | Ahmad et al. | 350/633 |

Primary Examiner—John K. Corbin
Assistant Examiner—Martin Lerner
Attorney, Agent, or Firm—Michael H. Wallach; Robert F. Rotella

[57] ABSTRACT

An adjustable mount for optical components is disclosed which permits a component held by the mount to be adjusted with six degrees of freedom. The mount includes means for locking the components of the mount to prevent vibration from affecting the adjustment of the mount while still permitting the mount to be assembled without applying excessive pressure to the mount's components, thereby permitting the position of an optical component held by the mount to be easily changed. When used to support an optical component, the mount permits the focus, tip and tilt, radial translation and rotation of the optical component relative to the brackets supporting the component to be changed without the need to cement the components of the mount into place to prevent vibration from affecting the adjustment of the components of the mount.

11 Claims, 3 Drawing Sheets

ADJUSTABLE SIX DEGREE OF FREEDOM MOUNT FOR OPTICAL COMPONENTS

The Government has rights in this invention pursuant to Contract No. F19628-82-C-0002 (subcontract No. BX-204) awarded by the Department of the Air Force.

BACKGROUND OF THE INVENTION

This invention discloses an adjustable mounting assembly which finds particular use for supporting components which must be aligned with respect to three axes and, in particular, to a mounting assembly for optical components which permits the components to be precisely aligned along three axes, i.e. with six degrees of freedom. Optical components, for example mirrors used in telescopes or high power laser systems or other optical systems must frequently be mounted using a mounting arrangement which permits the alignment of the supported optical component to be adjusted relative to other components in the system. Frequently, the extent of the adjustment required to align the system's components is small yet, this adjustment in alignment may be critical to insure the operation of the optical system at its maximum efficiency. The alignment problem becomes especially important if adjustment to the position of the supported optical component along more than one axis is required. For example, an aspheric mirror which is being aligned for use in a high power laser system may require alignment in the tip and tilt axes as well as rotation of the mirror about its optical axis. It may also require adjustment of its focus, i.e., movement along its optical axis toward or away from other optical components within the system. The problems associated with providing an adjustable mount for optical components which will permit adjustments such as those described above become more difficult to overcome if the supported optical component is heavy i.e., weighs tens of pounds rather then only a few pounds, and is subject to vibration, such as optical systems which are intended for deployment on aircraft or for launching into space.

Some prior known adjustable mounting systems have relied on the use of a cement or epoxy to lock the support mechanism for an optical component to prevent vibrations from changing the alignment of the optical component once the component was properly aligned. However, such systems, even if they permit all of the adjustments to the optical component described above, still suffer from the need to break the cement or epoxy seal holding the components of the mounting system to effect further changes to the alignment of the supported optical component. Not only is this an inconvenient task to perform, but it also raises the possibility of contaminating the various components of the optical system with particles of cement or epoxy which enter the system after the cement or epoxy seals restraining the mounting components from movement due to vibration are broken. Thus it can be appreciated that there is a need for a mounting system for optical components which will permit adjustments to be made to the alignment of the supported optical component with six degrees of freedom and which will retain its setting without the use of epoxy when the optical component is subject to vibration. Ideally, such a mounting system will also permit subsequent repositioning of the optical component along the component's three axes.

SUMMARY OF THE INVENTION

It is an object of this invention to provide an adjustable mount for optical components which will permit the alignment of the components to be adjusted with six degrees of freedom.

Another object of this invention is to provide an adjustable mount for optical components which may be adjusted and then locked without the use of adhesives being required to prevent the alignment of the supported optical component from changing due to vibration.

Still another object is to provide an adjustable mount for optical components which is suitable for supporting heavy optical components which may be subject to loads caused by vibrations and/or other load-producing phenomenon caused by pressure or temperature effects occurring in more than one plane relative to the component's optical axis.

The above and other objects and advantages of the invention are achieved by an optical mount having a pair of coaxially-mounted eccentric sleeves which rotate within a tapered bore ball which is received within a complementary seat in a support bracket attached to the optical component. Three such mounts may be used with three mounting brackets which are uniformly angularly spaced around the circumference of the optical component to fully support the optical component and to permit its movement with six degrees of freedom. Each of the three mounting brackets include a support shaft which passes through a spherical aperture contained in each of the support brackets. Each support shaft also passes through an aperture in the tapered bore ball and through apertures in the inner and outer eccentric sleeves. A pair of spherical washers and one or more shims position each of the support brackets attached to the optical component above its respective mounting bracket. A nut and nut retaining washer are threaded onto each support shaft and permit the various components of the optical mount to be locked into position once the alignment of the optical component has been completed. Thereafter, the optical component may be realigned or repositioned by freeing each of the nut retaining washers from the nuts and loosening the nuts on the support shafts to permit movement of the components of the optical mount to effect a change in the alignment of the supported optical component. Once realignment of the optical component has been completed, the nuts may be tightened against the inner eccentric sleeve and a tab on the nut retaining washers may be bent against one face of the nut to prevent rotation thereof, without the need to use cement or other adhesive on the adjustable components to lock them into position relative to each other. The disclosed optical mount permits adjustments to be made in the tip and tilt axes of the supported component; permits the component's focus to be adjusted; permits the component to be rotated around its optical axis, and also permits the supported optical component to be translated in two axes. The foregoing adjustments may be effected without requiring the use of cement or epoxy to lock the components of the mount against changes in their position due to vibration or other induced loads.

DESCRIPTION OF THE DRAWINGS

The foregoing and other objects and advantages of the invention maybe more readily understood from an examination of the detailed description of a preferred embodiment when read in conjunction with the accompanying drawings in which.

DETAILED DESCRIPTION OF A PREFERRED EMBODIMENT

Figure 1:
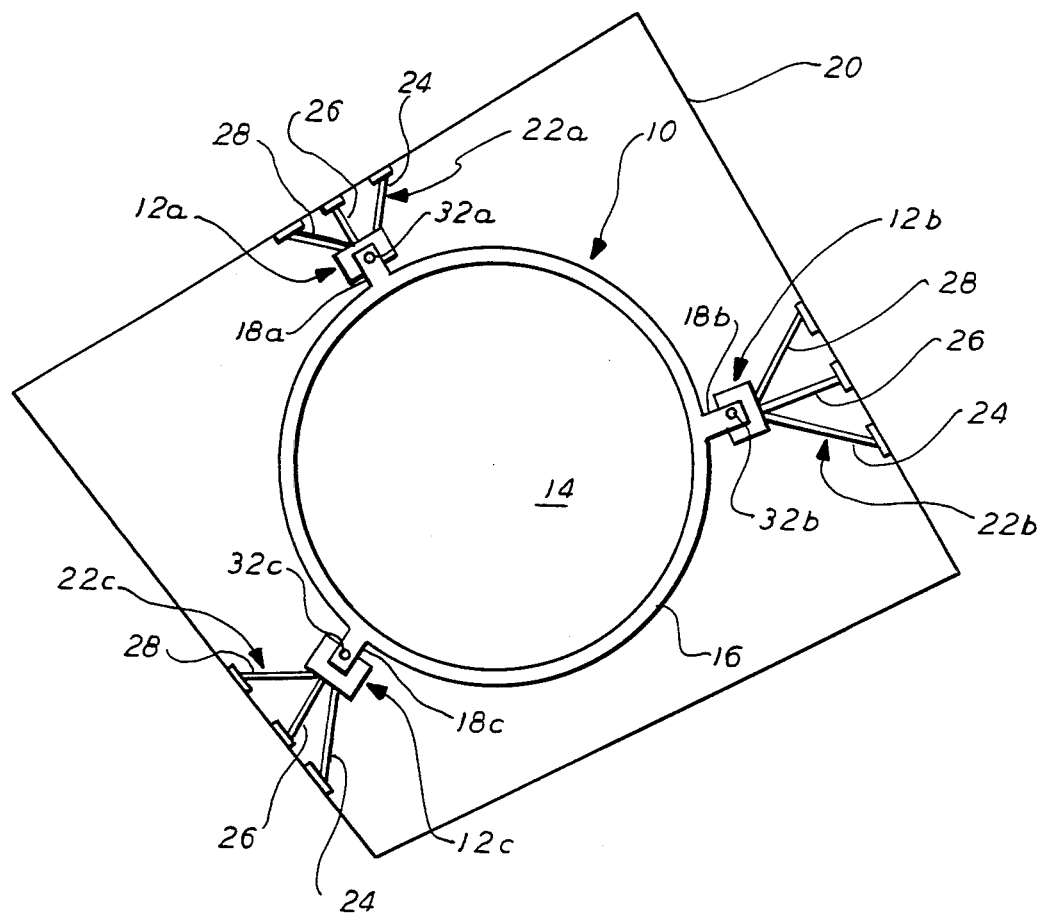
FIG. 1 is a top view of an optical component which is supported by three mounts constructed in accordance with the teachings of the present invention.

Referring to the drawing, FIG. 1 shows an optical component 10, for example a mirror, supported by three mounts, shown generally at 12a, 12b and 12c, which are constructed in accordance with the teachings of the present invention. While the invention is shown and described herein to support a mirror, it is to be understood that the invention has applicability to any component which must be mounted in mounts which permit the component to be adjusted with six degrees of freedom while preventing vibration or other loads influencing the component from affecting the positioning of the component. The mirror 10 has a reflecting surface 14 and is supported within a bezel 16 which encircles the mirror. The mirror 10 has an optical axis which is generally perpendicular to the surface 14 and which passes through the center of the mirror 10. Three support brackets, 18a, 18b and 18c extend from the bezel 16. The brackets 18a, 18b, and 18c are uniformly angularly spaced (i.e. 120 degrees) around the circumference of the mirror 10 to permit the mirror to be adjusted along its three axes. The three axes of adjustment include the tip and tilt axes, which lie in the plane of the mirror 10 and which are mutually perpendicular to each other, and the focus axis which is perpendicular to the tip and tilt axes and generally parallel to the mirror's optical axis. In the embodiment shown, the mirror 10 is supported within an enclosure 20, for example the walls of a telescope, by three mounting brackets shown generally at 22a, 22b and 22c. Each mounting bracket 22a, 22b and 22c includes rigid tripod legs 24, 26 and 28 which support a block 30 having a support shaft 32 which is a part of the invention. The end 34 of the support shaft 32 distant from the block 30 is threaded to accept a nut 36.

Figure 2:
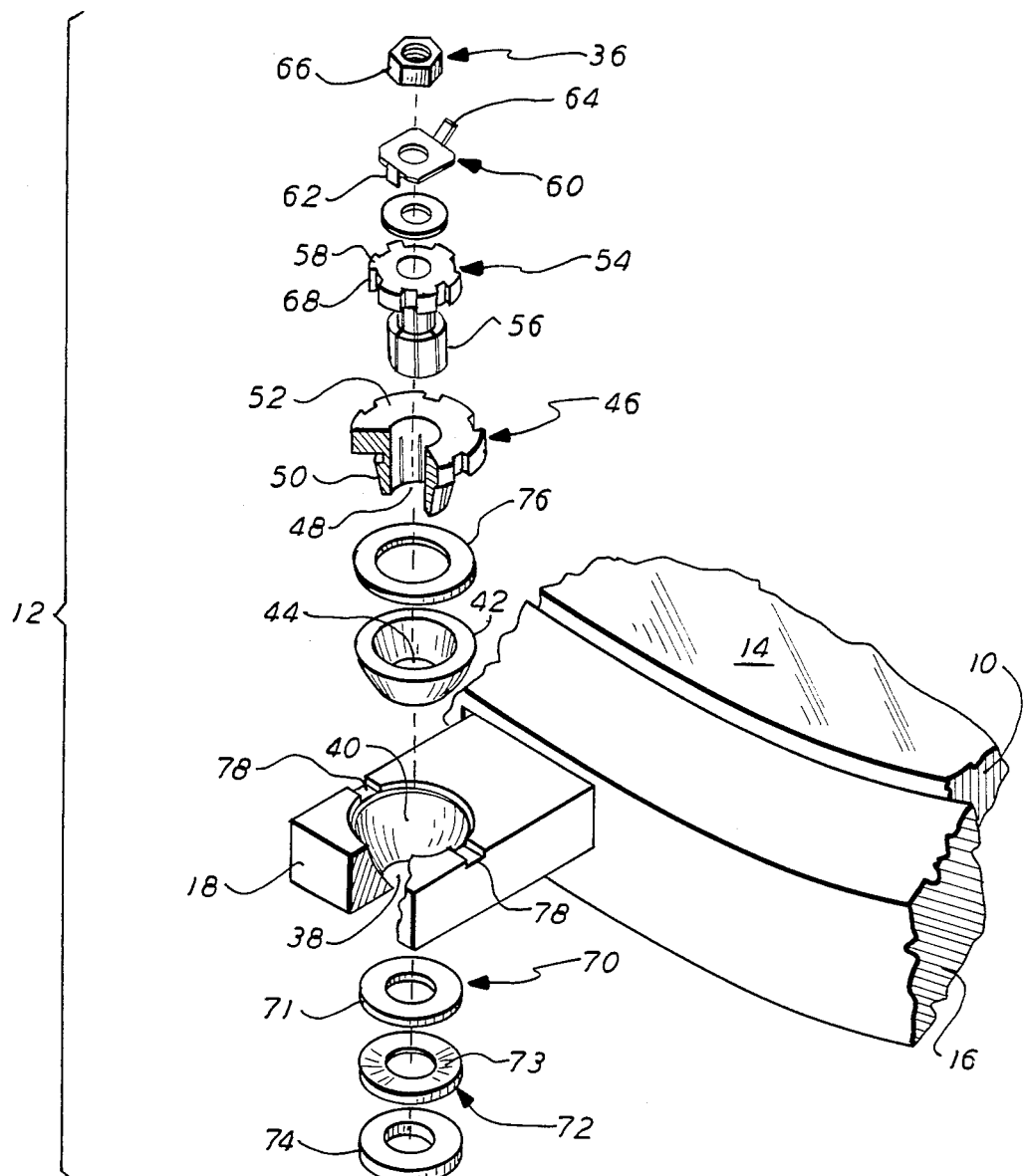
FIG. 2 is an exploded perspective view of a portion of an optical component supported by the disclosed invention snowing the various components of the optical mount.
Figure 3:
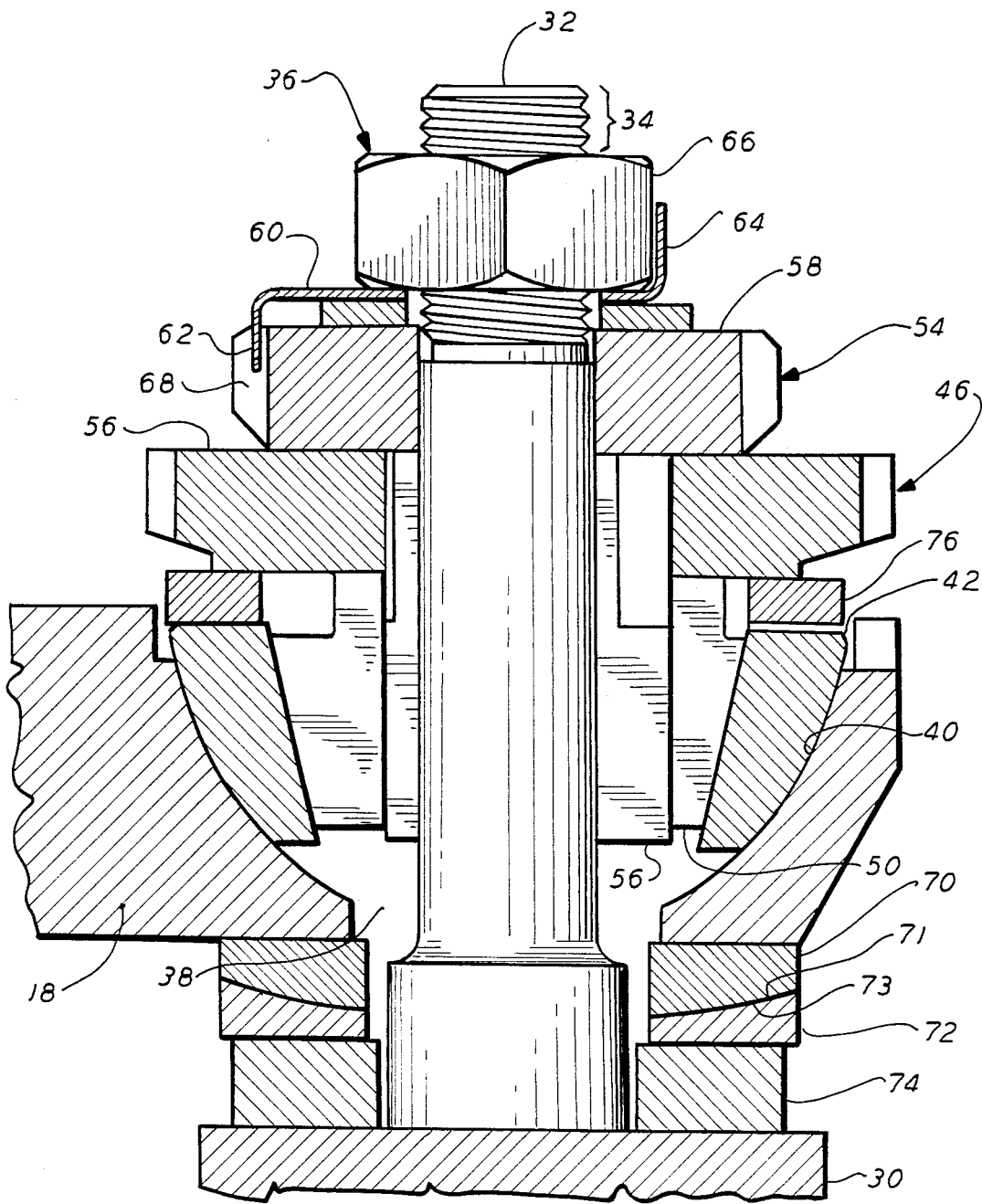
FIG. 3 is a cutaway plan view showing an assembled optical mount constructed in accordance with the teachings of the invention.

Referring now more particularly to FIGS. 2 and 3, each of the mounts 12a, 12b and 12c (which, in FIGS. 2 and 3 and in the accompanying description herein will be referred to without the letter prefixes "a", "b" or "c") are assembled axially along the axis of the support shaft 32, which passes freely through an enlarged bore 38 in the support bracket 18. Each support bracket 18 includes a spherical aperture 40 which is located coaxially along the axis of the bore 38 and which, in the described preferred embodiment receives a complementary tapered bore ball 42, having a tapered aperture 44 passing therethrough. The tapered bore ball 42 receives an outer eccentric sleeve 46 having an aperture 48 passing along the axis thereof. The outer eccentric sleeve 46 includes an eccentric tapered cam 50 at its lower extremity and a flat portion 52 at the end distant from the cam 50. An inner eccentric sleeve 54 having a lower eccentric cam portion 56 and a flat section 58 at the end distant from the cam portion 56 is coaxially mounted with the eccentric 46 and received partially within the aperture 48 of the eccentric 46, the cam portion 56 of the eccentric 54 being arranged to engage the walls of the aperture 48 while the flat section 58 is supported by the flat portion 52 of eccentric sleeve 46. The tapered bore ball 42 comprises a means for adjusting the tip and tilt of the optical component while the outer eccentric sleeve 46 and inner eccentric sleeve 54 comprise a means for adjusting the radial translation of the supported optical component relative to the location of the support shaft 32 and the rotation of the component relative to the optical axis of the component 10. The inner eccentric sleeve 54 and outer eccentric sleeve 46 and tapered bore ball 42 are locked against the bracket 18 by the nut 36 which engages the threaded end 34 of the shaft 32. A nut retaining washer 60 having tabs 62 and 64 is retained axially between the nut 36 and the inner eccentric sleeve 54 to permit locking the nut 36 relative to the eccentric sleeve 54 to prevent rotational movement therebetween by fitting the tab 62 into one of the slots 68 on the inner eccentric sleeve 54 and by bending the tab 64 against one of the faces 66 on the nut 36. The nut 36 and flat section 58 of the eccentric sleeve include multiple faces 66 and 68 respectively to accomodate locking by the washer 60 with the components of the optical mount in various positions.

A set of spherical washers 70, 72 having complementary mating spherical surfaces 71 and 73 respectively support the support bracket 18 above the block 30 of the mounting bracket 22. The spherical washers 70, 72 accomodate and adjust for angular movement of the support brackets 18 relative to the blocks 30. If required, a shim 74 may be added between the spherical washer 72 and the block 30 to adjust the height of the support bracket 18 relative to the block 30.

The preferred embodiment of the mount disclosed herein also includes a shim washer 76 disposed between the tapered bore ball 42 and the outer eccentric sleeve 46. The shim washer 76 is provided to control the amount of force generated by the nut 36 to wedge and lock the outer eccentric sleeve 46 into place. The shim 76 prevents damage to the eccentric sleeves 46 and 54 and to the tapered bore ball 42 and further insures that the components of the mount 12 will be easy to disassemble after the nut 36 has been tightened to retain adjustments made to the mount 12. The thickness of the shim 76 is selected by assembling all components of the mount 12 without the nut retaining washer 60 and the shim washer 76 and tightening the nut 36 to provide the desired amount of radial force between the tapered bore ball 42 and the inner eccentric sleeve 54. The clearance between the top of the tapered bore ball 42 and the bottom of the flat portion 52 of the outer eccentric sleeve 46 is then measured and a shim 76 is selected to fill the measured distance. The support brackets 18a, 18b and 18c include one or more grooves 78 to facilitate measurement of the distance between the top of the tapered bore ball 42 and the bottom of the outer eccentric sleeve 46.

The adjustable mount disclosed herein permits an optical component supported by three such mounts to be adjusted along the tip and tilt axes as well as permitting rotation of the component about the mirror's optical axis and translation of the mirror 10 relative to the mounting brackets 22a, 22b and 22c. Each of the foregoing adjustments may be effected in the following manner:

The focus of the optical component 10 may be changed by changing the spacing between the optical component 10 and the support brackets 18a, 18b and 18c. This may be accomplished by replacing the shim 74 with a thicker or thinner shim, as required.

The tip and tilt of the component 10 may be adjusted by pivoting the tapered bore ball 42 within the support bracket 18. The spherical washers 70 and 72 will experience a corresponding motion, thereby permitting tip and tilt of the bracket 18 relative to the support shaft 32. As may be best noted from FIG. 3, movement of the support brackets 18a, 18b and 18c relative to the shafts 32a, 32b and 32c is facilitated by making the diameter of each bore 38 larger than the diameter of each shaft 32.

Radial translation of the optical component 10 maybe accomplished by rotating the inner eccentric sleeve 54 and the outer eccentric sleeve 46 relative to each other and relative to the support shaft 32, thereby causing each support bracket 18a, 18b and 18c to translate relative to its associated support shaft 32a, 32b, 32c. The cam 50 of outer eccentric sleeve 46 is, as is best seen from FIG. 3, designed with a cam face whose shape is complementary to the inner face of the tapered bore ball 42, thereby assuring that the cam 50 will operate with the tapered bore ball 42 even when the tip and tilt of the optical component 10 have been changed such that the surface 14 of the component 10 is not perpendicular to the longitudinal axes of the support shafts 32.

Rotation of the optical component 10 about the optical axis of the mirror 10 may be accomplished by rotating the inner eccentric sleeve 54 and outer eccentric sleeve 46 relative to each other and relative to the support shaft 32, thereby causing each support bracket 18a, 18b and 18c to translate relative to its associated support shaft 32a, 32b and 32c in a direction perpendicular to a radius drawn from the mirror's optical axis to the associated support shaft 32a, 32b, and 32c.

The foregoing described optical mount may be used to support optical components whose position may require adjustment or realignment after the initial placement of the supported optical component within the optical mount. The invention is intended to include all reasonable embodiments and modifications thereto which would be apparent to one skilled in the relevant art, and the scope of coverage encompassed by the patent grant is intended to be limited only the permissible scope which maybe accorded to the following claims.

I claim:

1. An adjustable mount for optical components having an optical surface, said optical component having an optical axis substantially perpendicular to said optical surface and tip and tilt axes lying substantially within the plane of said optical surface, said optical component being mounted to two or more mounting brackets by said adjustable mounts, each of said adjustable mounts having a support shaft fastened to said mounting brackets, said support shafts having longitudinal axes along their lengths, said adjustable mount further including:
   a. Support brackets radiating outwardly from said optical component and spaced a substantially equal angular distance around the circumference of said optical component, the number of said support brackets being equal to the number of mounting brackets supporting said optical component and aligned with said mounting brackets, each of said support brackets having a spherical aperture passing therethrough, each of said apertures receiving one of said support shafts therein;
   b. adjustable means for axially translating the position of said optical component with respect to the axes of said support shafts;
   c. means for angularly adjusting said optical component along said tip and tilt axes;
   d. means for adjusting the position of said optical component in a direction parallel to said longitudinal axes of said support shafts; and
   e. means for angularly adjusting said optical component about an axis parallel to the axes of said support shafts.

2. The adjustable mount set forth in claim 1 wherein said adjustable means for axially translating the position of said optical component includes eccentric means coaxially positioned between said support shaft and said support bracket, said eccentric means having at least one cam surface movable around said support shaft between said support shaft and said support bracket.

3. The adjustable mount set forth in claim 2 wherein said means for angularly adjusting said optical component along said tip and tilt axes includes a tapered bore ball having an outer surface and an inner surface, the outer surface of said tapered bore ball being complementary in shape to said spherical aperture in said bracket to permit said tapered bore ball to be received within said spherical tapered aperture and rotate therein, said tapered bore ball having an aperture passing therethrough to receive said support shaft.

4. The arrangement set forth in claim 3 wherein each of said support brackets are supported above said support members by a pair of spherical washers, having complementary spherical surfaces, said spherical washers permitting said optical component to be angularly adjusted relative to the longitudinal axis of each of said support shafts.

5. The arrangement set forth in claim 3 wherein said eccentric means includes a first, outer eccentric sleeve and a second, inner eccentric sleeve, said inner eccentric sleeve having an eccentric cam at one end thereof, said eccentric cam being located within said outer eccentric sleeve when said first outer eccentric sleeve and said second inner eccentric sleeve are coaxially positioned on said support shaft.

6. The adjustable mount set forth in claim 5 further including locking means for preventing vibration from changing the adjustment of said adjustable mount.

7. The arrangement set forth in claim 6 wherein said locking means includes a nut and a threaded portion on each of said support shafts, said nut locking the components of said adjustable mount to said support shaft.

8. The arrangement set forth in claim 5 wherein said outer eccentric sleeve includes an eccentric cam on a lower end portion thereof, said eccentric cam of said outer eccentric sleeve being in contact with the inner surface of said tapered bore ball when said outer eccentric sleeve is mounted to said support shaft.

9. The arrangement set forth in claim 5 wherein said eccentric means may be adjusted to angularly adjust said optical component about an axis parallel to the axes of said support shafts.

10. The optical mount set forth in claim 1 wherein said means for adjusting the position of said optical component in a direction parallel to said longitudinal axes of said support shafts is comprised of one or more shims disposed between said mounting bracket and said support bracket.

11. The arrangement set forth in claim 10 wherein said one or more shims are washers, each of said washers having an aperture therethrough said washers being received on said support shafts and positioned beneath said support brackets to position said optical component above said support brackets.

* * * * *